(12) United States Patent
Egan

(10) Patent No.: US 10,408,978 B2
(45) Date of Patent: Sep. 10, 2019

(54) INFANT OBSERVATION DEVICE

(71) Applicant: Sheryl A Egan, Windham, NH (US)

(72) Inventor: Sheryl A Egan, Windham, NH (US)

( * ) Notice: Subject to any disclaimer, the term of this patent is extended or adjusted under 35 U.S.C. 154(b) by 20 days.

(21) Appl. No.: 15/872,802

(22) Filed: Jan. 16, 2018

(65) Prior Publication Data

US 2019/0219745 A1    Jul. 18, 2019

(51) Int. Cl.
  *B60R 1/00*   (2006.01)
  *G02B 5/10*   (2006.01)
  *B60N 2/28*   (2006.01)
  *G02B 5/08*   (2006.01)

(52) U.S. Cl.
  CPC .............. *G02B 5/10* (2013.01); *B60N 2/2863* (2013.01); *B60R 1/008* (2013.01); *G02B 5/0808* (2013.01)

(58) Field of Classification Search
  CPC ...... G02B 5/10; G02B 5/0808; B60N 2/2863; B60N 2/24; B60N 2/26; B60N 2/80; B60R 1/08; B60R 2300/8013
  See application file for complete search history.

(56) References Cited

U.S. PATENT DOCUMENTS

| 4,902,118 A * | 2/1990 | Harris | B60R 1/008 248/475.1 |
| 7,862,189 B1 * | 1/2011 | Freese | G02B 7/1822 248/479 |

* cited by examiner

*Primary Examiner* — William C. Dowling
(74) *Attorney, Agent, or Firm* — Hayes Soloway PC

(57) ABSTRACT

The present disclosure generally relates to an infant observation device. The infant observation device includes a reflective component. A first synthetic component may be disposed around the reflective component. The first synthetic component may form a pocket, where the reflective component may be disposed within the pocket formed by the first synthetic component. The first synthetic component may be engaged to a second synthetic component. The second synthetic component may form a receptacle. The second synthetic component may be configured to surround a headrest of a vehicle without the use of additional straps or fasteners.

19 Claims, 7 Drawing Sheets

INFANT OBSERVATION DEVICE

FIELD OF THE DISCLOSURE

The present disclosure generally relates to infant observation devices, and more particularly, to an infant observation device including a synthetic component to surround a headrest of a vehicle.

BACKGROUND

Many infant seats for a vehicle are rear-facing, i.e., facing in a direction opposite a user of the vehicle, such as a driver or passenger. Rear-facing car seats may better support the head, neck and spine of an infant, and are designed to mitigate injury to the infant n the event of a collision by distributing any forces across the shell of the car seat.

However, the user of the vehicle may be unable to view the infant in the rear-facing seat while driving the vehicle. Many conventional infant monitoring mirrors assist in viewing the infant in the rear-facing infant seat by reflecting an image of the infant to the rear-view mirror of a vehicle. The driver may look to the rear-view mirror of the vehicle to view the image of the infant reflected by the infant monitoring mirror.

Conventional infant monitoring mirrors require fastening to the vehicle or a headrest of the vehicle. For example, many conventional infant monitoring mirrors include multiple straps that must be connected to secure the infant monitoring mirrors to the headrest of the vehicle. However, straps may be hazardous to infants. Additionally, as a vehicle moves, the straps of conventional infant monitoring mirrors may loosen. This loosening may cause the infant monitoring mirror to fall from a proper position and no longer reflect an image of the infant in the rear-facing car seat to the driver.

SUMMARY

Embodiments of the present disclosure provide an infant observation device. The infant observation device may include a reflective component. A first synthetic component is located around the reflective component. A second synthetic component is engaged to the first synthetic component, and the second synthetic component may form a receptacle. The second synthetic component is configured to surround a headrest of a vehicle.

The first synthetic component may comprise a greater elastic modulus than the second synthetic component. The first synthetic component may include a first portion and a second portion stitched together to form a pocket, where the reflective component may be located in the pocket formed between the first portion and the second portion. The first portion may form an aperture configured to expose a portion of the reflective component.

The second synthetic component may include an enclosed first end and a second end defining an opening. The enclosed first end of the second synthetic component may be configured to be inverted through the opening at the second end of the second synthetic component. The second synthetic component may include at least two connection members within the receptacle formed within the second synthetic component, where the connection members may frictionally engage and close the opening at the second end of the second synthetic component.

The reflective component may comprise acrylic. The reflective component may be substantially convex and include a length between 6 and 9 inches. The second synthetic component may include nylon and at least 20% elastane. The first synthetic component may include at least one of nylon, polyester, and elastane. The infant observation device may include an intermediate component adhered to the reflective component. The first synthetic component and the second synthetic component may be sewn together.

The present disclosure can also be viewed as providing an infant observation device including a first synthetic component including a first portion and a second portion, where the first portion and second portion are stitched together to form a pocket. A reflective component is disposed within the pocket. A second synthetic component is stitched to the first synthetic component, where the second synthetic component forms a receptacle. The second synthetic component is configured to surround a headrest of a vehicle.

The second synthetic component may include nylon and elastane. The first portion may form a circular aperture to expose a portion of the reflective component. The second synthetic component may include a first end and a second end, wherein the second end defines an opening. The first end of the second synthetic component may be inverted through the opening formed the second end of the second synthetic component. The infant observation device may include at least two connection members disposed within the receptacle formed within the second synthetic component, where the connection members are configured to frictionally engage and close the opening formed at the second end of the second synthetic component. The first synthetic component may comprise a greater elastic modulus than the second synthetic component.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure relates to an infant observation device. The infant observation device may include a reflective component. The reflective component may allow the user to observe the infant by reflecting an image of the infant. The infant observation device includes a first synthetic component. The first synthetic component may be disposed around the reflective component. The first synthetic component may be engaged to a second synthetic component. The second synthetic component may form a receptacle and may be configured to surround a headrest of a vehicle.

The second synthetic component may surround around the headrest of a vehicle to keep the infant observation device in proper position without additional straps or fasteners. The present embodiments of an infant observation device may allow for secure fit onto the headrest and greater safety to the infant by not requiring additional straps or fasteners. The fit of the infant observation device may prevent the device from being removed in the event of a sudden movement of the vehicle. The elasticity of the first synthetic component and the second synthetic component may provide a proper fit onto various sized headrests of a vehicle while keeping the reflective component in proper position to reflect an image of the infant.

Figure 1:
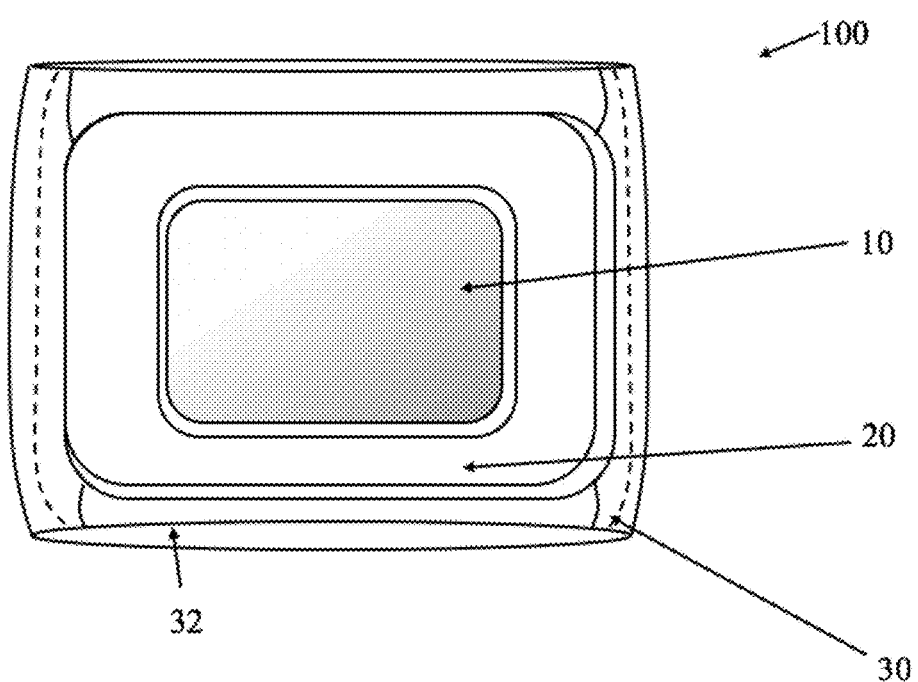
FIG. 1 is a perspective view illustration of an infant observation device, in accordance with some embodiments of the present disclosure.

FIG. 1 is a perspective view illustration of an infant observation device 100, in accordance with some embodiments of the present disclosure. The infant observation device 100 may include a reflective component 10, a first synthetic component 20, and a second synthetic component 30. The infant observation device 100 may be configured to engage with a headrest of a vehicle, such as an automobile. The infant observation device 100 may allow for optical observation of an infant in a rear-facing car seat. As shown further in FIG. 5, a user may view an image of the infant reflected by the infant observation device 100 through the rear-view mirror of a vehicle.

As shown in FIG. 1, the infant observation device 100 includes a reflective component 10. The reflective component 10 is configured to reflect an image, and in some embodiments, the reflective component 10 may reflect an image of an infant. The reflective component 10 may include a reflective material such as acrylic, glass, or another suitable material known in the industry. In an embodiment, the reflective component 10 includes reflective acrylic.

In some embodiments, the reflective component 10 is substantially rectangular. The reflective component 10 may include another suitable shape, such circular, elliptical, or square. In one embodiment, the length of the reflective component 10 comprises a length ranging between 6 inches and 9 inches. In another embodiment, the reflective component 10 comprises a length ranging between 7 and 8 inches. The reflective component 10 may comprise a height ranging between 5 and 10 inches. In some embodiments, the reflective component 10 is substantially convex. In another embodiment, the reflective component 10 is substantially concave.

As shown in FIG. 1, the infant observation device 100 includes a first synthetic component 20. The first synthetic component 20 may be disposed around the reflective component 10. The first synthetic component 20 may comprise at least one synthetic material, such as nylon, polyester, elastane, or another suitable material known in the industry.

The infant observation device 100 includes a second synthetic component 30. The second synthetic component 30 may be configured to surround a headrest of a vehicle. The second synthetic component 30 may be engaged to the first synthetic component 20. In one embodiment, the second synthetic component 30 is stitched to the peripheral edges of the first synthetic component 20. The second synthetic component 30 may form a receptacle 32. The headrest of a vehicle may be disposed within the receptacle 32.

The first synthetic component 20 and the second synthetic component 30 each comprise an elastic modulus. An elastic modulus, which also may be referred to as a Young's modulus, is a measure of the elasticity of the component. Generally, a greater elastic modulus represents a lower elasticity of the component. The first synthetic component 20 may include a greater elastic modulus than the second synthetic component 30. The first synthetic component 20 may include a greater elastic modulus to reduce stretching and to ensure the reflective component 10 stays in proper position when the infant observation device 100 is disposed around a headrest of a vehicle. The second synthetic component 30 may include a lower elastic modulus to stretch around headrests of various sizes. In one embodiment, the first synthetic component and the second synthetic component may include an elastic modulus ranging from 0.5 to 3 gPA.

The second synthetic component 30 may include at least one of nylon, polyester, elastane, or another suitable material known in the industry. In one embodiment, the second synthetic component 30 comprises nylon and at least 20% elastane. The second synthetic component 30 may include a greater percentage of elastane to decrease the elastic modulus of the second synthetic component 30, and allow for the second synthetic component 30 to surround headrests of various sizes.

Figure 2A:
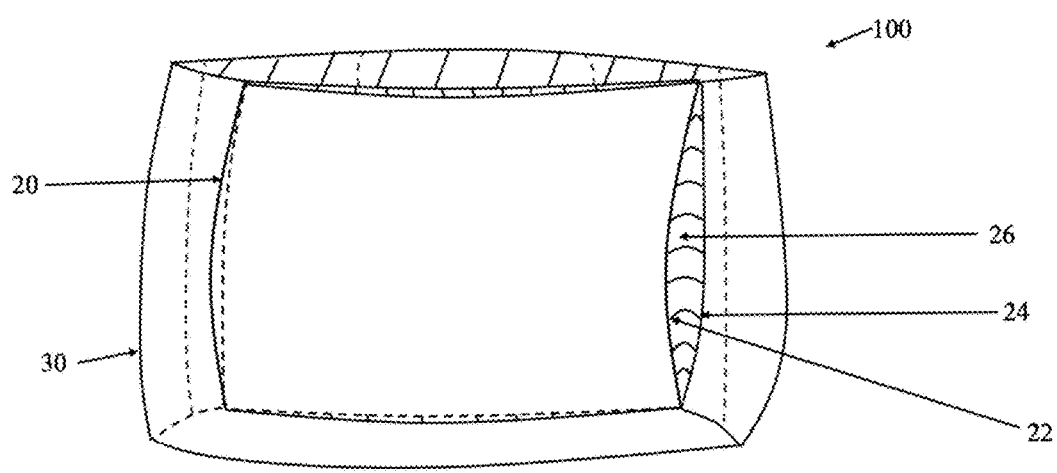
FIGS. 2A and 2B are perspective view illustrations of an infant observation device, in accordance with some embodiments of the present disclosure.
Figure 2B:
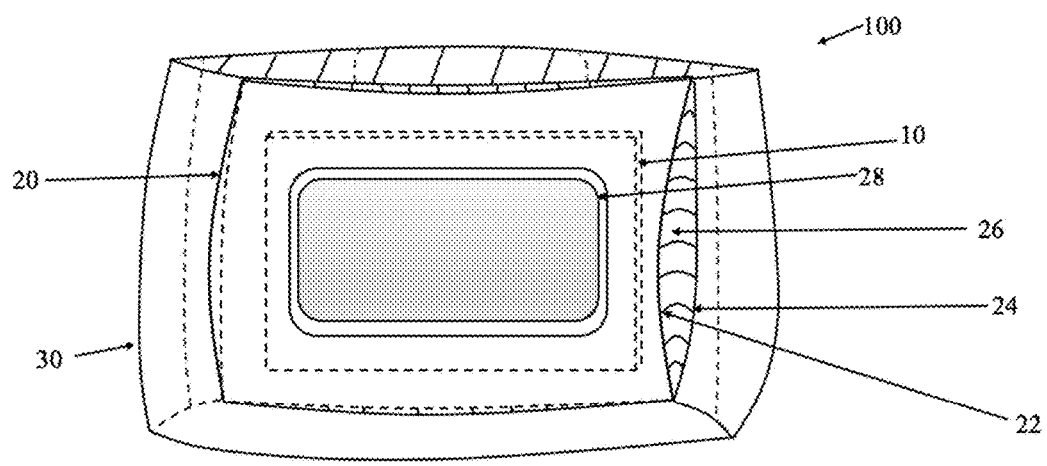

FIGS. 2A and 2B are perspective illustration views of the infant observation device 100, in accordance with some embodiments of the present disclosure. As shown in FIG. 2A, the first synthetic component 20 may include a first portion 22 and a second portion 24. The first portion 22 and second portion 24 may be engaged together.

In some embodiments, the first portion 22 and the second portion 24 are stitched together to form a pocket 26 between the first portion 22 and second portion 24. The peripheral edges of the first portion 22 and the second portion 24 may be stitched together to form the pocket 26.

The first portion 22 and the second portion may be stitched together using any conventional stitching methods known in the industry. Such methods may include, but is not limited to, back stitching, cross stitching, basting stitching, or back tacking. Any stitching may be made using a known thread material, such as polyester thread. Any additional edges of either the first synthetic component 20 or second synthetic component 30 may be stitched to prevent fraying.

In the embodiment as shown in FIG. 2B, the pocket 26 may be configured to receive the reflective component 10. The pocket 26 may be configured to hold the reflective component 10 in proper positioning to keep the reflective component 10 in a proper line of sight. The pocket 26 may be fully enclosed by stitching around the peripheral edges of the first portion 22 and second portion 24.

In an embodiment, an aperture 28 may be formed within the first portion 22. The aperture 28 may be formed from a removed part of the first portion 22 to allow part of the reflective component 10 to be visible. The aperture 28 may be formed in a variety of configurations, such as, but not limited to, square, rectangular, circular, or elliptical configurations. The inner edge of the first portion 22 forming the aperture 28 may be stitched to prevent fraying.

Figure 3:
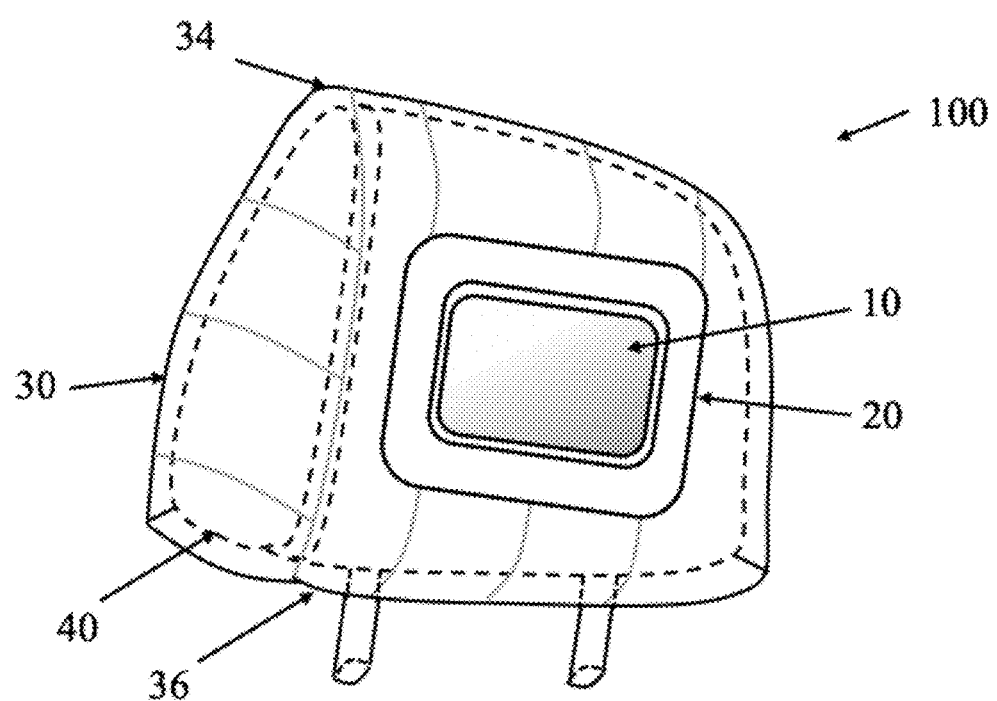
FIG. 3 is a side view illustration of an infant observation device, in accordance with some exemplary embodiments of the present disclosure.

FIG. 3 is a perspective view illustration of an infant observation device 100, in accordance with some exemplary embodiments of the present disclosure. The infant observation device 100 may include a reflective component 10, a first synthetic component 20, and a second synthetic component 30.

In some embodiments, the second synthetic component 30 may include a first end 34 and a second end 36. In one embodiment, the first end 34 is disposed at the top of the infant observation device 100 and the second end is disposed at the bottom of the infant observation device 100. In an embodiment, the first end 34 is enclosed and the second end 36 forms an opening. The first end 34 may be stitched to close any opening formed at the first end 34. In this embodiment, the infant observation device 100 may fit around a headrest 40 by placing the device 100 over the headrest 40 through the opening formed in the second end 36 of the second synthetic component 30. The elasticity of the second synthetic component 30 may allow for the infant observation device 100 to form a tight fit around the headrest 40. The elasticity of the second synthetic component 30 may allow for the infant observation device 100 to make an appropriate fit around headrests 40 of varying sizes. The second end 36 may be disposed below the bottom of the headrest 40. In one embodiment, the second end 36 may include a fastening component such as a drawstring or a frictional connection member to tighten the opening formed at the second end 36 around the headrest 40.

Figure 4A:
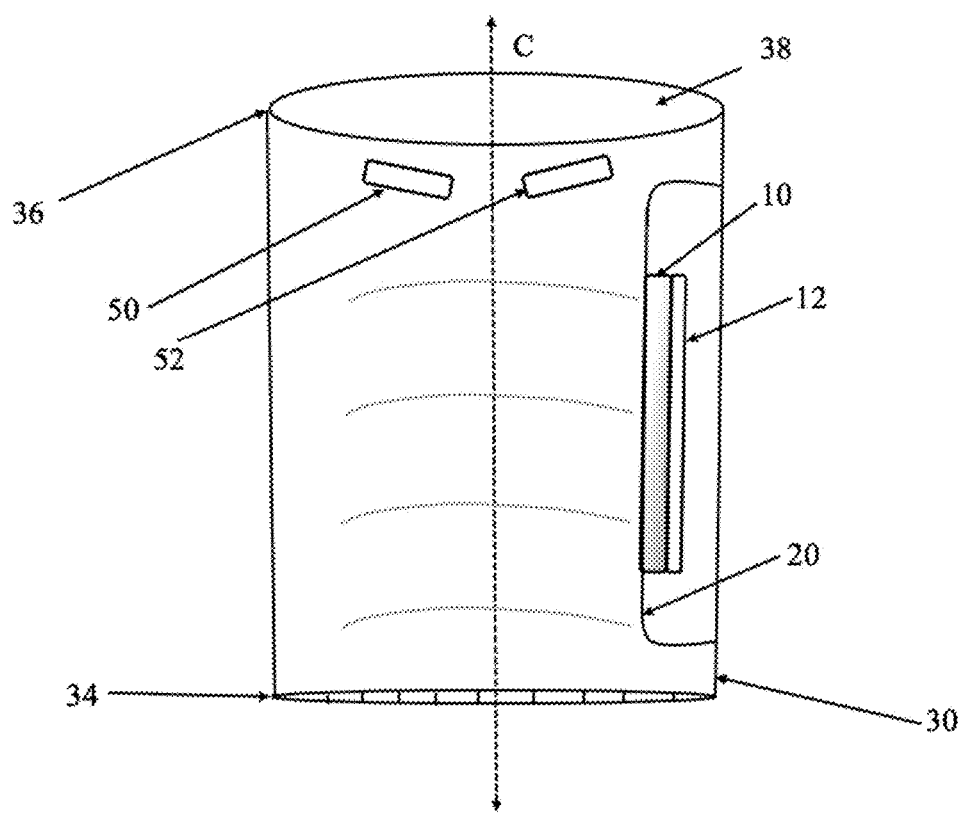
FIGS. 4A and 4B are perspective view illustrations of the infant observation device in an inverted orientation, in accordance with some embodiments of the present disclosure.
Figure 4B:
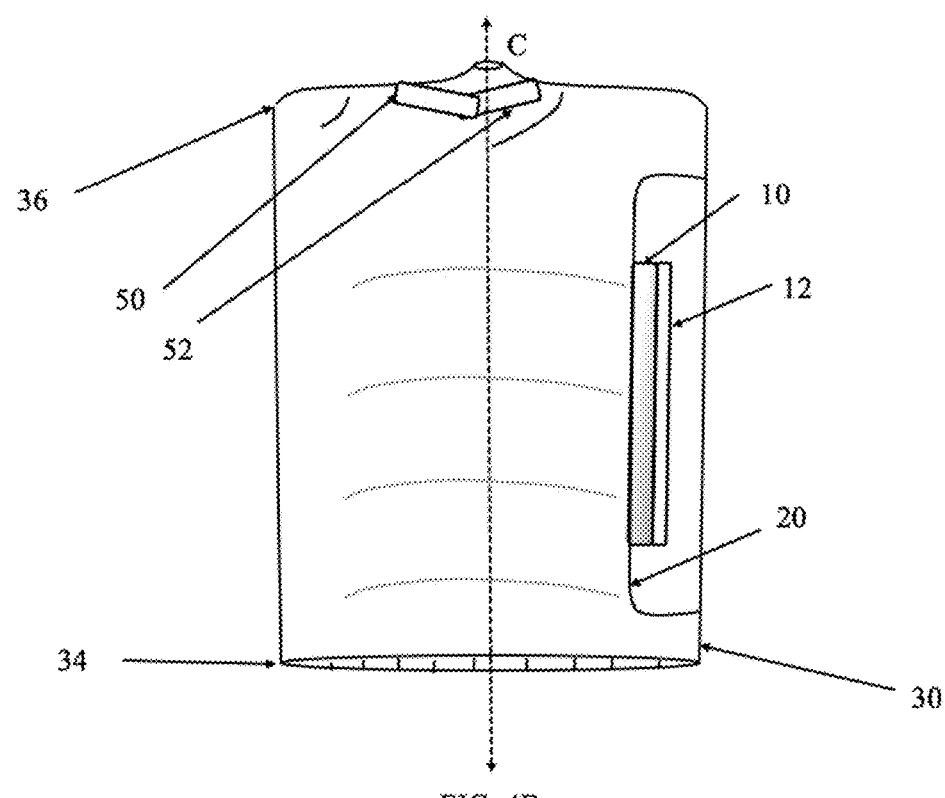

FIGS. 4A and 4B are perspective view illustrations of the infant observation device 100 in an inverted orientation, in accordance with some embodiments of the present disclosure. As shown in FIG. 4A, the infant observation device 100 may be disposed in an inverted orientation. To configure the infant observation device 100 in the inverted orientation, the first end 34 comprising a closed end may be disposed through the opening formed in the second end 36. In the inverted orientation, the reflective component 10 may be disposed within the inverted orientation receptacle 38 formed by the second synthetic component 30 in the inverted orientation. The reflective component 10 in the inverted orientation may be directed toward the central axis C of the device 100. The infant observation device 100 disposed in the inverted orientation may prevent the reflective component 10 from scratching and to allow the device 100 to be held with greater ease.

As shown in FIG. 4A, the infant observation device 100 may include an intermediate component 12. The intermediate component 12 may be engaged to the reflective component 10 to provide additional resiliency to the reflective component 10. The intermediate component 12 may be adhered to the reflective component 10 using an adhesive such as glue, tape, or a mechanical fastener such as a tieback, for example. The intermediate component 12 may comprise plastic, wood, cardboard, or any other known material in the industry. In an embodiment, the intermediate component 12 may include a material with magnetic properties. The magnetic material may allow for other magnetic components to magnetically engage with the magnetic material.

As shown in FIG. 4A, the infant observation device 100 may include connection members 50, 52. Connection members 50, 52 may be disposed within the receptacle 32. In the inverted orientation, the connection members 50, 52 may be exposed on the exterior surface of the infant observation device 100. The connection members 50, 52 may be configured to engage with one another. In one embodiment, the connection members frictionally engage. The connection members 50, 52 may comprise a suitable connection member including, but not limited to, tape, hook-and-loop fasteners, drawstrings, or VELCRO®. In an embodiment, the connection members 50, 52 frictionally engage to one another.

In the embodiment as shown in FIG. 4B, the connection members 50, 52 are engaged to one another. The connection members 50, 52 may be configured to close the opening formed at the second end 36 of the second synthetic component 20. The connection members 50, 52 may frictionally engage to one another to close the opening formed at the second end 36. For example, a first connection member 50 may be wrapped around the second end 36 and engaged to the second connection member 52.

Figure 5:
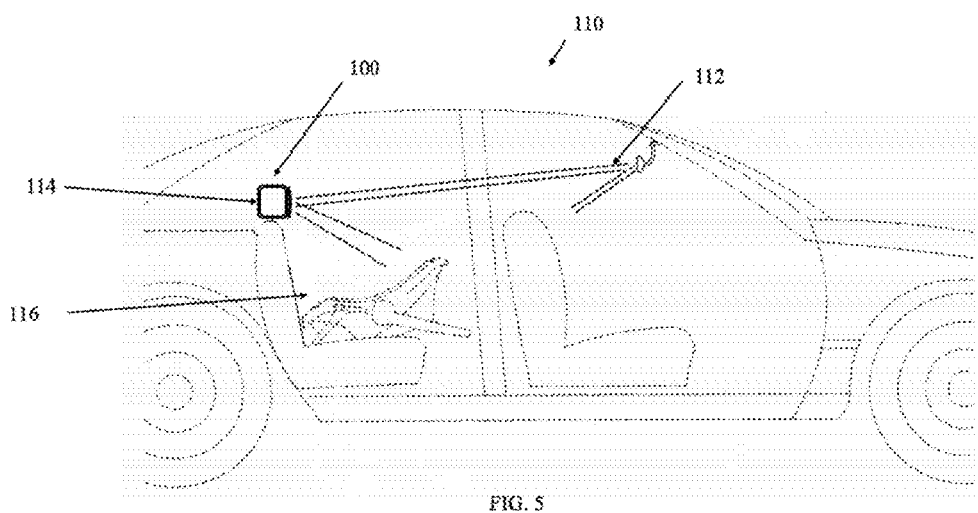
FIG. 5 is a side view illustration of an infant observation device within a vehicle, in accordance with some embodiments of the present disclosure.

FIG. 5 is a side view illustration of an infant observation device 100 within a vehicle 110, in accordance with some embodiments of the present disclosure. As shown in FIG. 5, a driver or passenger of a vehicle 110 may maintain a line of sight with a rear-facing child sear 116 using the infant observation device 100.

In some embodiments, the infant observation device 100 is disposed around a headrest 114 of the vehicle 110. In one embodiment, the infant observation device 100 may be positioned to provide a line of sight between the rear-view mirror 112 and the rear-facing child seat 116. The user may look to the rear-view mirror 112 to view a reflected image from the infant observation device 100. The infant observation device 100 may reflect an image of the rear-facing child seat 116 to the rear-view mirror 112. This may allow for the driver to view an infant in the rear-facing child seat 116 while operating the vehicle. In another embodiment, a user of a vehicle may turn and view an image of the infant in the rear-facing child seat 116 through the infant observation device 100.

It should be emphasized that the above-described embodiments of the present disclosure, particularly, any "preferred" or "illustrative" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. An infant observation device, comprising:
   a reflective component;
   a first synthetic component disposed around the reflective component; and
   a second synthetic component engaged to the first synthetic component,
      wherein the second synthetic component forms a receptacle and the second synthetic component comprises an enclosed first end disposed at a top of the infant observation device and connected to a second end disposed at a bottom of the infant observation device, wherein the second end defines an opening,
      and wherein the second synthetic component is configured to surround a headrest of a vehicle and the second end is configured to fit over the headrest.

2. The infant observation device of claim 1, wherein the first synthetic component comprises a greater elastic modulus than the second synthetic component.

3. The infant observation device of claim 1, wherein the first synthetic component includes a first portion and a second portion stitched together to form a pocket, wherein the reflective component is disposed in the pocket formed between the first portion and the second portion.

4. The infant observation device of claim 3, wherein the first portion forms an aperture configured to expose a portion of the reflective component.

5. The infant observation device of claim 1, wherein the enclosed first end of the second synthetic component is configured to be inverted through the opening at the second end of the synthetic component.

6. The infant observation device of claim 1, further comprising at least two connection members disposed within the receptacle formed within the second synthetic component, wherein the connection members are configured to frictionally engage and close the opening at the second end of the second synthetic component.

7. The infant observation device of claim 1, wherein the reflective component comprises acrylic.

8. The infant observation device of claim 1, wherein the reflective component is substantially convex and includes a length between 6 and 9 inches.

9. The infant observation device of claim 1, wherein the second synthetic component includes nylon and at least 20% elastane.

10. The infant observation device of claim 1, wherein the first synthetic component includes at least one of nylon, polyester, and elastane.

11. The infant observation device of claim 1, further comprising an intermediate component adhered to the reflective component.

12. The infant observation device of claim 1, wherein the first synthetic component and the second synthetic component are sewn together.

13. An infant observation device, comprising:
a first synthetic component including a first portion and a second portion, wherein the first portion and second portion are stitched together to form a pocket;
a reflective component disposed within the pocket; and
a second synthetic component stitched to the first synthetic component,
wherein the second synthetic component forms a receptacle,
and wherein the second synthetic component is configured to surround a headrest of a vehicle.

14. The infant observation device of claim 13, wherein the second synthetic component includes nylon and elastane.

15. The infant observation device of claim 13, wherein the first portion forms a circular aperture to expose a portion of the reflective component.

16. The infant observation device of claim 13, wherein the second synthetic component includes a first end and a second end, wherein the second end defines an opening.

17. The infant observation device of claim 16, wherein the first end of the second synthetic component is inverted through the opening formed the second end of the second synthetic component.

18. The infant observation device of claim 16, further comprising at least two connection members disposed within the receptacle formed within the second synthetic component, wherein the connection members are configured to frictionally engage and close the opening formed at the second end of the second synthetic component.

19. The infant observation device of claim 13, wherein the first synthetic component comprises a greater elastic modulus than the second synthetic component.

* * * * *